June 11, 1968  G. ZOEHFELD  3,387,768
FASTENER

Filed April 8, 1966  2 Sheets-Sheet 1

INVENTOR.
GUNTHER ZOEHFELD
BY
Brumbaugh, Free, Graves & Donohue
his ATTORNEYS

June 11, 1968 G. ZOEHFELD 3,387,768
FASTENER

Filed April 8, 1966 2 Sheets-Sheet 2

INVENTOR.
GUNTHER ZOEHFELD
BY
Brumbaugh, Free, Graves & Donohue
his ATTORNEYS 3,387,768
FASTENER
Gunther Zoehfeld, West Hurley, N.Y., assignor to Rotron Manufacturing Company, Inc., Woodstock, N.Y., a corporation of New York
Filed Apr. 8, 1966, Ser. No. 541,328
8 Claims. (Cl. 230—117)

ABSTRACT OF THE DISCLOSURE

This improvement in fasteners provides means for removably attaching one member in a blind hole in a second member with a predetermined force through the utilization of a conical spring clip, the legs of which are cammed outward into a rearwardly facing shoulder portion of the first member.

---

This invention relates to a novel and improved fastener and, more particularly, to a fastener for connecting two members together with a predetermined force and which permits readily removable attachment of one member in a blind hole in a second member.

One situation in which problems are encountered in selecting a suitable type of fastener is when one part is to be secured in a blind opening in another part. Sometimes it is not possible to thread the opening in the second part to receive a screw, and the fact that the opening is blind precludes the use of a nut. Even when the blind opening can be threaded, the problem of preventing a screw from loosening is sometimes difficult to overcome. Conventional lock washers can be used, but their reliability is not great, particularly when vibrations will be encountered in use.

There is provided, in accordance with the invention, a novel and improved fastener which provides a predetermined preloading and which is particularly well suited for installation in a blind hole. One of the members to be fastened together includes an opening having a rearwardly facing shoulder portion, the shoulder either being a groove extending into the inner surface of the opening or the rear surface of the member. The other member includes a portion received in the opening in the first member and has on its inner end, with respect to the opening, rearwardly facing camming surfaces so located thereon as to be immediately adjacent the shoulder of the first member. A fastener element having a plurality of forwardly extending, diverging resilient legs is provided, and a suitable connector, such as a screw installed in the second member, is connected to the fastener element. Tightening of the screw draws the fastener element forward so that the legs on the fastener element, which are normally retracted so that their extremities readily pass through the opening in the first member, are cammed outwardly by the camming surfaces into holding engagement with the shoulder on the first member.

Preferably, the camming surfaces on the second member are related to the rearwardly facing shoulder portion on the first member such that when the fastener element body is drawn down into engagement with the end of the second member, the legs are flexed out of engagement with the cam surfaces. The bending of the legs provides a predetermined preload on the fastener, the magnitude of which is established by the degree of bending and the strength of the legs, which draws the second member into engagement with the first with a predetermined force and also serves to lock the fastener on the screw.

With the fastener of the invention, it is possible to readily disconnect the two members from each other by unthreading the screw or bolt so that the resilient legs of the fastener element retract inwardly to their normal positions. When so retracted, the legs readily clear the opening in the first member, and the second member can be removed from the opening. Moreover, a definitely established preload on the fastened is obtained using the fastener of the invention.

For a better understanding of the invention reference may be made to the following description of an exemplary embodiment, taken in conjunction with the figures of the accompanying drawings, in which.

Figure 1:
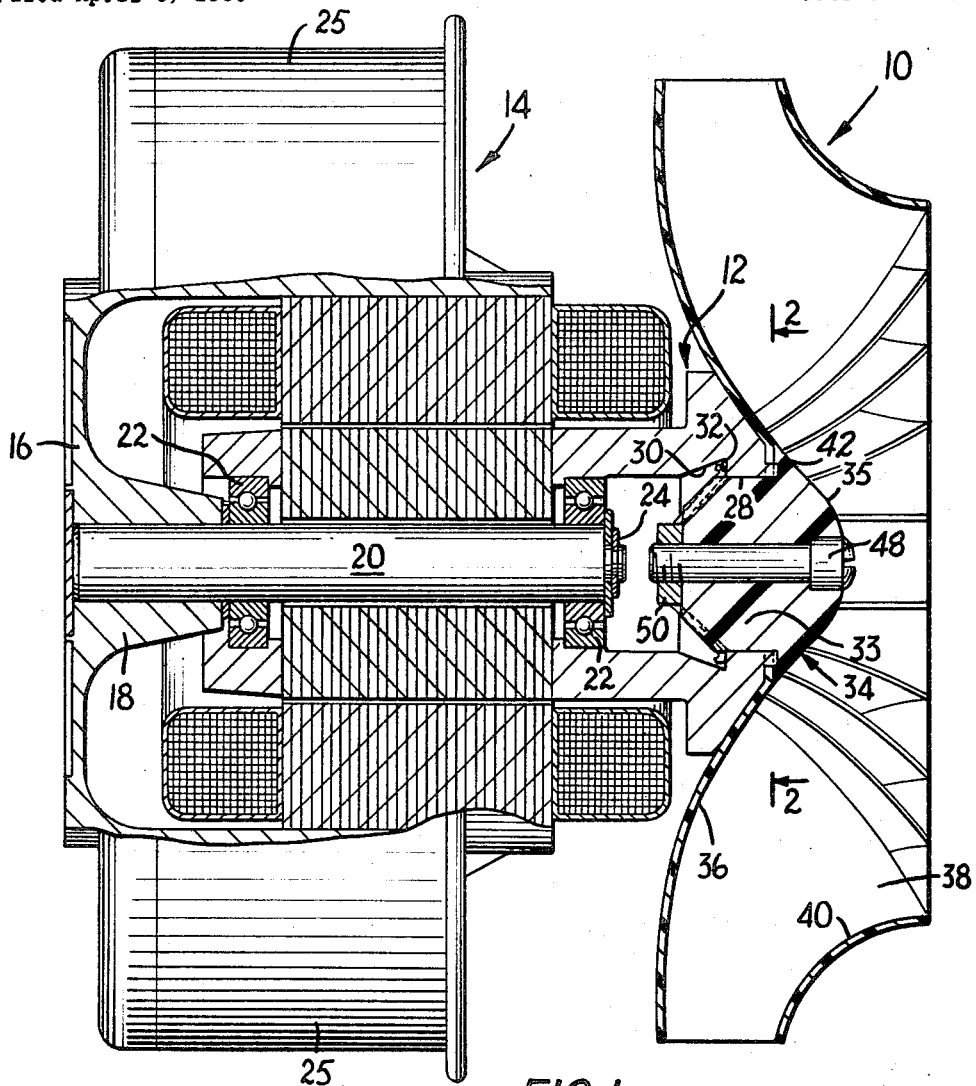
FIG. 1 is a side view in section showing the use of the fastener of the invention in a fan to secure the fan impeller to the motor rotor.

Referring to FIG. 1, the illustrated embodiment of the fastener is employed to connect a fan impeller 10 to the rotor 12 of a motor 14 which drives the impeller. In particular, the back end wall 16 of the motor case is provided with an inwardly extending boss 18 in which a fixed shaft 20 is installed, and the rotor 12 of the motor is journaled by means of bearings 22 on the shaft 20 for rotation thereon. The rotor 12 is retained on the shaft 20 by a split ring 24 which affords removal and replacement of the rotor or bearings quickly and easily. The motor case includes an annular section 25 extending about its circumference, which contains the wire leads, starting circuitry, terminals, and the like, of the motor.

Figure 2:
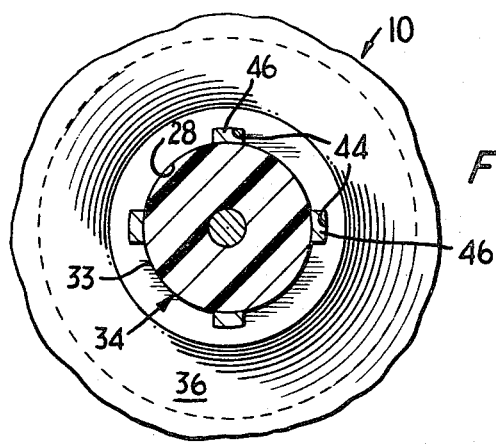
FIG. 2 is an end view in section taken generally along a plane defined by the line 2—2 of FIG. 1 and in the direction of the arrows.

Formed in an extended, integral end ring at the front end of the rotor 12 is an axially aligned bore 28 which includes a tapered groove 30 defining a rearwardly facing shoulder 32. The bore 28 receives the cylindrical rear portion 33 of an impeller hub 34. The front portion 35 of the impeller hub 34 defines an aerodynamic surface which merges into and is contiguous with the front surface of the impeller back plate 36. The back plate 36 carries a plurality of blades 38, which in the embodiment illustrated in the drawings, are mixed flow blades, and an annular shroud 40 is affixed to the opposite edges of the blades 38. A flange portion 42 on the hub includes four recesses 44 (best illustrated in FIG. 2), each of which receives a forwardly projecting key 46 formed on the forward edge of the rotor 12. When the impeller is installed on the rotor, matching slots in the back plate 36 engage the keys 46, thereby coupling the rotor and impeller together for conjoint rotation.

Figure 3:
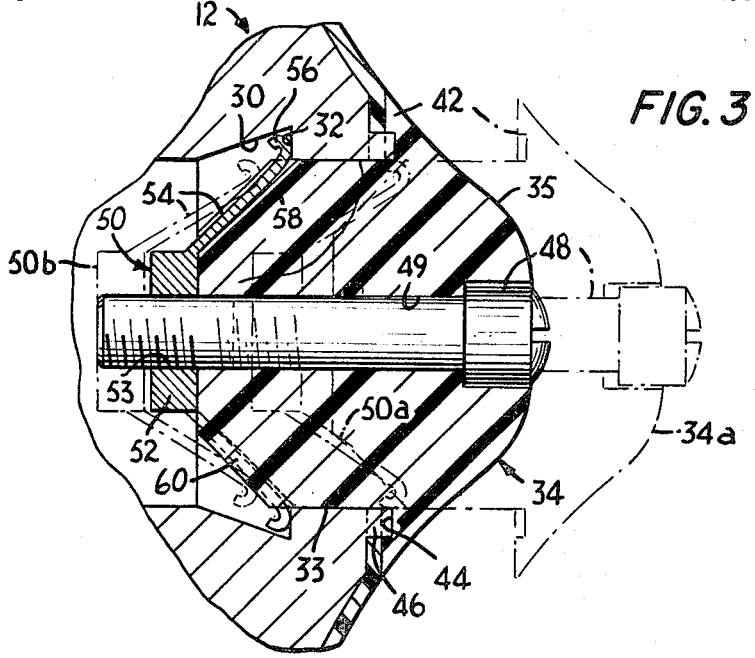
FIG. 3 is a partial side view in section, similar to a portion of FIG. 1 but on a larger scale.
Figure 4:
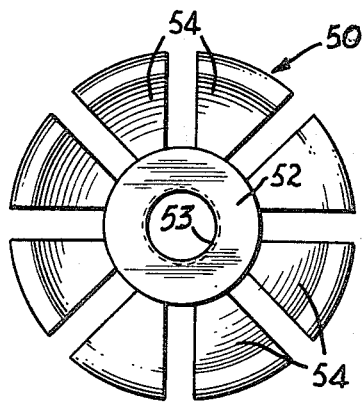
FIG. 4 is an end elevational view of the fastener element, the view being taken looking to the left in FIG. 3.
Figure 5:
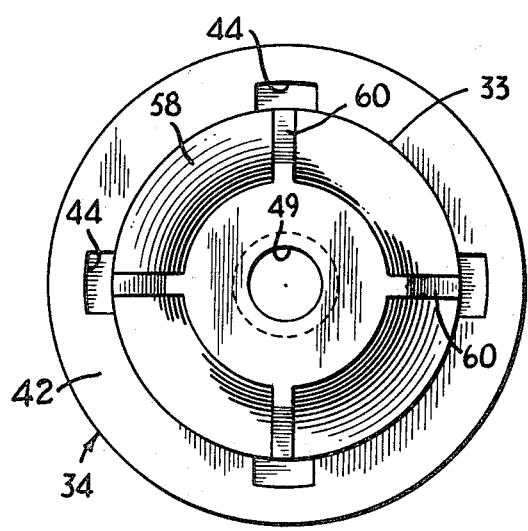
FIG. 5 is an end elevational view in the inwardly located end of the impeller hub, the view being taken looking to the right in FIG. 3.

Referring next particularly to FIGS. 3, 4 and 5, the impeller 10 is installed on the rotor 12 by means of a screw 48 inserted through an axial hole 49 in the hub 34 and threaded into a fastener element 50 (FIG. 4). The fastener element 50 includes a body 52 having a threaded hole 53 for receiving the threaded end of the screw 48. A plurality of generally pie-shaped, resilient legs 54 extend forwardly and diverge outwardly from the body 52. The legs 54 are normally retracted inwardly so that the fastener element passes freely through the bore 28 in the rotor 12, as shown by the position of the fastener element 50a and hub 34a shown in phantom lines in FIG. 3. Upon turning the screw 48 in a direction to draw the fastener element 50 toward the hub 34, the ends 56 of the legs 54, which are curved outwardly and rearwardly to form a smooth, rolled surface, engage a relatively diverging, conical camming surface 58 formed on the back end of the impeller hub 34. During rotation of the screw 48, the fastener element 50 is held against relative rotation with respect to the hub by engagement of given ones of the legs 54 of the fastener element with ribs 60 projecting from the camming surface 58.

The outward camming of the legs 54 along the camming surface 58 of the hub terminates when the body of the fastener element engages the end of the hub 34. In the meantime the forwardmost end portions of the legs 54 of the fastener element have come into engagement with the shoulder 32 of the groove 30, and have been bent away from the hub out of contact with the camming surface 58. The resilient force of the bent legs 54 is transmitted through the screw to draw the hub into position on the rotor 12 and hold it there with the predetermined force provided by the inherent resiliency of the legs 54. This value of force is established automatically by engagement of the fastener element body 52 with the end of the hub 34, such engagement governing the degree of stress in the legs 54.

When it is desired to remove the impeller, for example, to replace the impeller, rotor, or bearings, or other parts of the fan, all that is required is to unscrew the screw 48 to an extent sufficient to permit the legs 54 to retract to the positions they occupy when no load is imposed on them, the position represented in FIG. 3 in phantom lines as indicated by the reference numeral 50b. The impeller may then be readily removed by simply pulling it axially out of the opening 28 in the rotor 12. Thereafter, the impeller can be reinstalled using the same fastener, which incidentally undergoes no appreciable change in structure or characteristics upon repeated use.

Thus there is provided, in accordance with the invention, a novel and improved fastener which is so constructed as to be readily and easily used in a blind opening and to provide a predetermined preload connection between two parts. In this regard it is unnecessary to completely remove the screw to remove the impeller from attachment to the rotor, partial unthreading of the screw from the fastener element to an extent sufficient to retract the legs 54 to their normal positions being adequate to permit removal.

Although in the specific embodiment illustrated in the drawings and described in detail herein the fastener is employed in a fan to mount an impeller on a fan motor, it will be readily apparent that the fastener can be used in a variety of devices and that the advantages and results provided by it will be equally applicable. In addition, the fastener element can be in the form of a washer and used with a nut or press-on type connector rather than having a threaded body. Thus, it will be understood that the above described embodiment of the invention is merely exemplary.

Many modifications and variations, such as those mentioned above, of the fastener can be made by those skilled in the art without departing from the spirit and scope of the invention, and all such modifications and variations are intended to be included within the scope of the invention as defined in the appended claims.

I claim:

1. A fastener for releasably connecting a first member to a second member comprising means defining an opening in the first member, the opening including rearwardly facing shoulder portions, a portion on the second member extending into the opening and having a rearwardly facing camming surface thereon located adjacent the shoulder, a fastener element having a body and a plurality of forwardly extending and diverging resilient legs thereon, the legs being normally retracted such that the extremities of their outer ends readily pass through the opening in the first member, means connecting the second member to the fastener element and holding the fastener element in relation thereto such that the legs of the fastener element are cammed outwardly into holding engagement against the shoulder on the first member, and one of the members having a portion thereon engageable by a portion of the fastener element to restrict its movement toward the shoulder portions of the first member and thereby limit the strain in the legs when they are engaged with the shoulder portions of the first member to a value providing a predetermined preload connection between the members.

2. A fastener for releasably connecting a first member to a second member comprising means defining an opening in the first member, the opening including rearwardly facing shoulder portions, a portion on the second member extending into the opening and having a rearwardly facing camming surface thereon located adjacent the shoulder, a fastener element having a body and a plurality of forwardly extending and diverging resilient legs thereon, the legs being normally retracted such that the extremities of their outer ends readily pass through the opening in the first member, and means connecting the second member to the fastener element and holding the fastener element in relation thereto such that the legs of the fastener element are cammed outwardly into holding engagement against the shoulder on the first member, the second member having means defining an abutting surface engageable by the fastener element body to restrict its movement toward the shoulder portions of the first member and thereby limit the strain in the legs when they are engaged with the shoulder portions of the first member, the strain in the legs providing a predetermined preload connection between the members.

3. A fastener for releasably connecting a first member to a second member comprising means defining an opening in the first member, the opening including rearwardly facing shoulder portions, a portion on the second member extending into the opening and having a rearwardly facing camming surface thereon located adjacent the shoulder, a fastener element having a body and a plurality of forwardly extending and diverging resilient legs thereon, the legs being normally retracted such that the extremities of their outer ends readily pass through the opening in the first member, and threaded means connecting the second member and the fastener element together and holding the fastener element in relation to the second member such that the legs of the fastener element are cammed outwardly into holding engagement against the shoulder of the first member, one of the first and second members having means in interfering relation to at least one of the legs on the fastener element and cooperating therewith to resist relative rotation between the said one of the first and second members and the fastener element.

4. A fastener according to claim 3 wherein the interfering means includes a rib on the second member received between the legs of the fastener element.

5. A fastener according to claim 3 wherein the legs of the fastener element have ends which are bent outwardly and rearwardly so as to present smooth surfaces for engagement with the shoulder on the first member.

6. A fan comprising a motor including a rotor having an axially disposed bore in one end thereof, the bore having a rearwardly facing shoulder, an impeller including a hub having a portion extending into the bore of the rotor, the said portion of the impeller hub having a rearwardly facing tapered camming surface located inwardly of the shoulder, a fastener element having a body and a plurality of forwardly extending diverging resilient legs, the legs being normally retracted such that their extremities readily pass through the bore in the rotor, and means connecting the impeller hub to the fastener element and holding the fastener element in relation thereto such that the legs of the fastener are cammed outwardly along the camming surface and into holding engagement with the shoulder in the rotor bore.

7. A fan according to claim 6 wherein the hub includes means defining an abutting surface which is engageable by the body of the fastener element to restrict the movement of the fastener element toward the shoulder in the bore and thereby limit the strain imposed on the legs of the fastener element and provide a predetermined preload connection between the impeller and the rotor.

8. A fan according to claim 6 wherein the said portion of the impeller hub includes a projection received between the legs of the fastener and cooperating therewith to resist relative rotation between the hub and the fastener element.

References Cited
UNITED STATES PATENTS 2,101,030 12/1937 Kunze _____ 220—24.5
3,143,675 8/1964 Havenstein _____ 103—87 X ROBERT M. WALKER, *Primary Examiner.*